July 31, 1962 G. K. MACHOL 3,047,853

SIGNAL CONVERTER

Filed April 4, 1958

INVENTOR.
GUENTHER K. MACHOL

BY Richard E. Cummins

ATTORNEY 3,047,853

SIGNAL CONVERTER

Guenther K. Machol, San Jose, Calif., assignor to International Business Machines Corporation, New York, N.Y., a corporation of New York Filed Apr. 4, 1958, Ser. No. 726,479

1 Claim. (Cl. 340—347)

This invention relates in general to signal converters and in particular to a system for converting a binary coded, non-return-to-zero signal to a modified non-return-to-zero signal referred to in the art as a Ferranti waveform.

A quite common practice in the automatic electronic processing of data is to encode the data to be processed in a binary code and to process the binary coded information automatically by representing it as electrical signals. Various schemes have been suggested in the prior art for representing the binary coded information as an electrical signal. For example, in one suggested arrangement binary "1" is represented by a positive voltage level while binary "0" is represented by a negative voltage level. In another suggested arrangement, referred to in the art as a non-return-to-zero scheme, binary "1" is represented by a positive voltage level while binary "0" is represented by the absence of the positive voltage level or, in other words, a zero level. A third suggested arrangement represents binary "1" as a change from a first level to a second level in one direction and binary "0" as a change from the second level to the first level in the opposite direction.

While each of the above schemes is satisfactory, it has long been recognized that under certain circumstances one scheme may offer more advantages than the others from the circuitry and operational standpoints. It is therefore desirable in certain instances to be able to convert from one scheme to another provided that the addition of the converter to the data processing system does not obviate the advantages obtained in the conversion process. The converters suggested in the prior art for converting an NRZ signal to a Ferranti type signal have in general been rather complicated and hence have not been readily adaptable. The converter shown in copending application Serial No. 699,795, now Patent No. 3,001,140, filed November 29, 1957, and assigned to the present assignee, is relatively simple and provides a unique solution to the conversion problem. However, it has been found in accordance with the present invention that a still more simple circuit arrangement may be provided for converting an NRZ informational signal to a Ferranti type signal.

It is therefore an object of the present invention to provide an improved system for converting from an NRZ informational signal to a Ferranti type signal.

Another object of the present invention is to provide an NRZ-to-Ferranti signal converter which employs only simple logical circuits.

Other objects of the invention will be pointed out in the following description and claim and illustrated in the accompanying drawings, which disclose, by way of example, the principle of the invention and the best mode which has been contemplated of applying that principle.

Figures 1, 2, 3, 4:
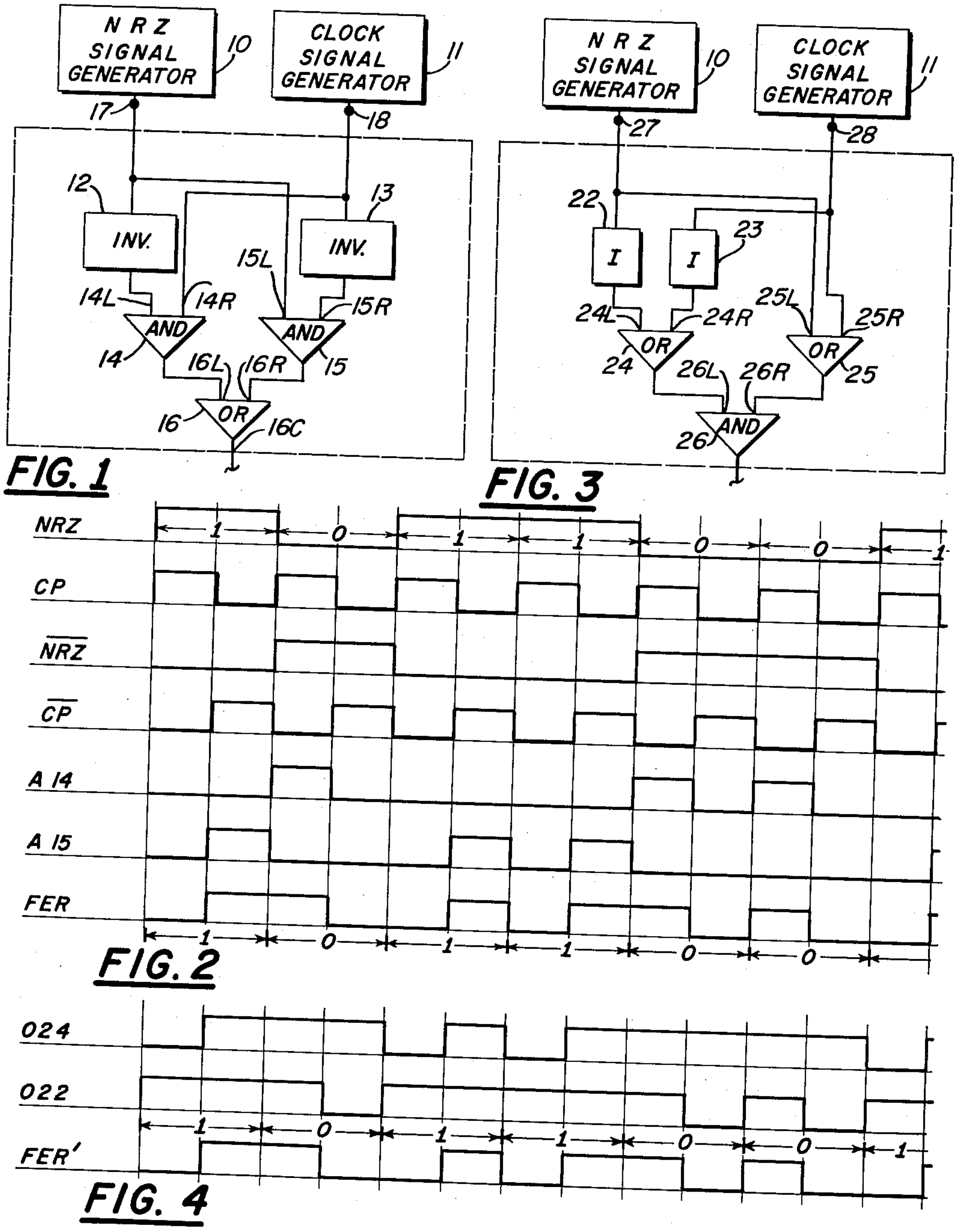
FIG. 1 is a diagrammatic view of the conversion system embodying the present invention.
FIG. 2 is a graph showing the waveforms at various points in the circuit of FIG. 1.
FIG. 3 is a diagrammatic view illustrating a modification of the conversion system shown in FIG. 1.
FIG. 4 is a graph illustrating waveforms at various positions in the circuit of FIG. 3.

Referring to the drawings and particularly to FIG. 1, the conversion system illustrated therein comprises an NRZ information signal generator 10, a clock pulse signal generator 11, a pair of inverters 12 and 13, a pair of logical AND gates 14 and 15, and a logical OR gate 16.

NRZ signal generator 10 is shown in block form in that practically any suitable device for providing NRZ signals to input terminal 17 of the converter may be employed. Similarly, clock pulse signal generator 11 is shown in block form in that any suitable device for providing timed clock pulses to terminal 18 of the converter may be employed. The signals applied to terminals 17 and 18 are shown in FIG. 2 and designated "NRZ" and "CP," respectively.

Input terminal 17 of the converter is connected directly to input terminal 15L of AND gate 15 and indirectly to terminal 14L of AND gate 14 through inverter 12. Terminal 15L therefore receives the informational signal designated NRZ in FIG. 2, while terminal 14L receives the inverted signal designated $\overline{\text{NRZ}}$ in FIG. 2.

Input terminal 18, adapted to receive the clock pulse signal CP, is connected directly to input terminal 14R of AND gate 14 and indirectly to input terminal 15R of AND gate 15 through the inverter 13. Terminal 14R therefore receives the signal designated CP in FIG. 2, while terminal 15R receives the inverted signal designated $\overline{\text{CP}}$ in FIG. 2.

AND gate 14 provides the signal designated "A14" in FIG. 2 to terminal 16L of OR gate 16, while AND gate 15 provides the signal designated "A15" to terminal 16R of OR gate 16. The operation of logical AND and OR gates being well known in the art, the generation of the signals A14 and A15 and FER will be obvious from FIG. 2. It will be seen that the signal designated "FER" in FIG. 2, attained at terminal 16C of OR gate 16, corresponds to the Ferranti representation of the NRZ informational signal supplied from NRZ signal generator 10, binary "1" being represented by a positive change from a low level to a high level and binary "0" being represented by a change from a high level to a low level, each change occurring during the middle of the bit interval.

A modification of the converter shown in FIG. 1 is shown in FIG. 3 and comprises a pair of inverters 22 and 23 and a pair of OR gates 24 and 25 which drive an AND gate 26. Input terminal 27 of the converter, adapted to receive the NRZ information signal, is connected directly to terminal 25L of OR gate 25 and indirectly to terminal 24L of OR gate 24 through inverter 22. Likewise, input terminal 28, adapted to receive clock pulse signals, is connected directly to input terminal 25R of OR gate 25 and indirectly to terminal 24R of OR gate 24 through the inverter 23.

The output terminals of the OR gates 24 and 25 are connected respectively to input terminals 26L and 26R of AND gate 26. The input signals to the OR gates, being identical to the first four signals shown in FIG. 2, are not repeated in FIG. 4. In FIG. 4 the output signal from OR gate 24 is designated O24 while that from OR gate 25 is designated O25. The output signal from the converter is designated FER' and is identical to the FER signal shown in FIG. 2.

It should be noted that while both embodiments of the converter have been illustrated as embodying inverters for obtaining complementary signals, these may be omitted where signal complementary to the NRZ informational signal and the CP clock signal are available externally, which is in most applications quite common since bistable devices are often employed in generating the CP signal and the NRZ informational signal.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What is claimed is:

A system for converting a non-return-to-zero binary input to a Ferranti type binary output represented by changes from one voltage level to another in the middle of a bit period, the system comprising: means for generating a non-return-to-zero signal representing binary numbers by a voltage level during a bit period, means for generating a clock signal represented by a voltage level pulse each half bit period and in timed relationship to the non-return-to-zero signal, first and second inverters, first and second AND gates, means connecting the output of the non-return-to-zero signal generating means directly to an input of a first AND gate and indirectly through the first inverter to the second AND gate, means connecting the output of the clock signal generating means directly to the other terminal of said second AND gate and indirectly through said second inverter to the other terminal of said first AND gate, an OR gate, and means connecting the output of said first and second AND gates to the input of said OR gate to provide at the output terminal of said OR gate a Ferranti type output signal in which the voltage level changes in one direction to represent said one binary number and changes in the opposite direction to represent said other binary number.

References Cited in the file of this patent

UNITED STATES PATENTS

| | | |
|---|---|---|
| 2,798,667 | Spielberg et al. | July 9, 1957 |
| 2,813,259 | Burkhart | Nov. 12, 1957 |
| 2,823,855 | Nelson | Feb. 18, 1958 |
| 2,912,684 | Steele | Nov. 10, 1959 |